US010473815B2

(12) United States Patent
Huang

(10) Patent No.: US 10,473,815 B2
(45) Date of Patent: Nov. 12, 2019

(54) TIME-DELAYED ENLARGED THREE-DIMENSIONAL (3D) GRAVITATIONAL WAVE DETECTION SYSTEM

(71) Applicant: Andrew Xianyi Huang, Arcadia, CA (US)

(72) Inventor: Andrew Xianyi Huang, Arcadia, CA (US)

( * ) Notice: Subject to any disclaimer, the term of this patent is extended or adjusted under 35 U.S.C. 154(b) by 241 days.

(21) Appl. No.: 15/429,473

(22) Filed: Feb. 10, 2017

(65) Prior Publication Data

US 2018/0011216 A1 Jan. 11, 2018

Related U.S. Application Data

(60) Provisional application No. 62/360,386, filed on Jul. 10, 2016.

(51) Int. Cl.
*G01V 7/02* (2006.01)

(52) U.S. Cl.
CPC .................................. *G01V 7/02* (2013.01)

(58) Field of Classification Search
None
See application file for complete search history.

(56) References Cited

U.S. PATENT DOCUMENTS

| 5,780,856 A * | 7/1998 | Oka ........................ G01T 1/203 250/366 |
| 7,349,591 B2 * | 3/2008 | Maas ...................... G01P 1/023 385/13 |
| 2007/0237473 A1 * | 10/2007 | Chen ....................... G01J 1/04 385/115 |
| 2016/0146661 A1 * | 5/2016 | Martin ............... G01D 5/35361 356/482 |

* cited by examiner

*Primary Examiner* — Chad H Smith
(74) *Attorney, Agent, or Firm* — Che-Yang Chen; Law Offices of Scott Warmuth

(57) ABSTRACT

A time-delayed enlarged three-dimensional (3D) gravitational wave detection system may include a three optical fibers along three axes (X, Y, and Z-axis); and a laser signal source operatively linked with the three optical fibers; wherein structures of the three optical fibers are identical, and are adapted to pick up space/lengths changed caused by gravitational waves. And, the laser signal source includes a narrow linewidth laser to generate laser lights, an electro-optic modulator (EOM) connected with the narrow linewidth laser to modulate the phase of laser light, and a RF signal source connected to the EOM to provide ultra-stable RF signal to the EOM. In one embodiment, said narrow linewidth laser is adapted for carrying the ultra-stable RF signal, and said ultra-stable RF source is used for detecting length changes caused by the gravitational waves.

20 Claims, 6 Drawing Sheets

TIME-DELAYED ENLARGED THREE-DIMENSIONAL (3D) GRAVITATIONAL WAVE DETECTION SYSTEM

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a gravitational wave detection system, and more particularly to a time-delayed enlarged three-dimensional (3D) gravitational wave detection system.

Description of Related Arts

The detection of the gravitational wave (GW) is essential for the research of the universe's history, cosmology, astrophysics, and proof of fundamental physics laws. Over one hundred years have passed since Albert Einstein predicted the existence of GW in his theory of general relativity. Many individuals and groups have been working on the search of the GW in past century. The GWs are extremely weak when they reach the earth—they only cause a change in space/distance on the magnitude of 1 part in $10^{22}$. They have never been directly detected until late last year. A US led international team has built the Laser Interferometer Gravitational-Wave Observatory (LIGO) in 1992, and it took more than 20 years, with costs exceeding $620 million dollars, before the GWs were ever detected (specifically in September of 2015). LIGO includes two interferometers, however, for real space GW detection, we need three-dimensional information, which means that we have to build more interferometers (the cost will be about $310 million per interferometer). Therefore, a more cost efficient three-dimensional GW detection system and method is needed for detecting gravitational wave.

SUMMARY OF THE PRESENT INVENTION

The invention is advantageous in that it provides a time-delayed enlarged three-dimensional (3D) gravitational wave detection system which provides a cost-efficiently way to accurately detect the gravitational waves.

Another advantage of the invention is to provide a time-delayed enlarged three-dimensional (3D) gravitational wave detection system which can be simply arranged without expensive instruments and intensive labors.

Another advantage of the invention is to provide a time-delayed enlarged three-dimensional (3D) gravitational wave detection system which comprises three branches to detect the gravitational waves from different directions.

Additional advantages and features of the invention will become apparent from the description which follows, and may be realized by means of the instrumentalities and combinations particular point out in the appended claims.

According to the present invention, the foregoing and other objects and advantages are attained by a time-delayed enlarged three-dimensional (3D) gravitational wave detection system, comprising:

a three optical fibers along three axes (X, Y, and Z-axis); and a laser signal source operatively lined with the three optical fibers; wherein said three optical fibers are identical, and are adapted to pick up space/lengths changed caused by gravitational waves.

In accordance with another aspect of the invention, the present invention comprises a multiple channel three-dimensional (3D) gravitational wave detection, comprising:

a three optical fibers along three axes (X, Y, and Z-axis);

a laser signal source operatively lined with the three optical fibers; and a three-dimensional (3D) info analysis connected with the branches to collect the entire three-dimensional (3D) gravitational wave information; wherein said three optical fibers are identical, and are adapted to pick up space/lengths changed caused by gravitational waves.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Figure 1:
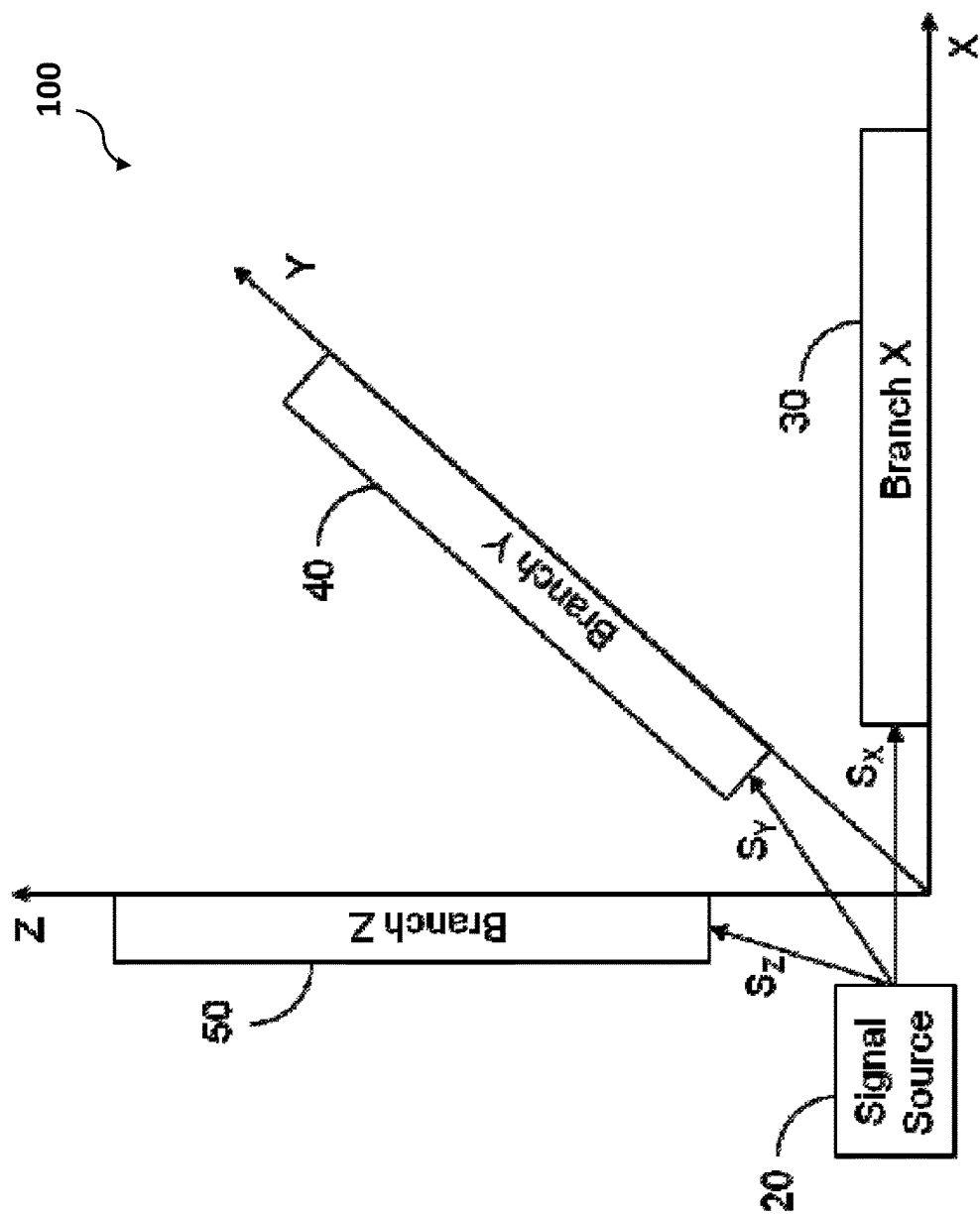
FIG. 1 is a schematic view of a three-dimensional (3D) gravitational wave detection system according to a first aspect of the present invention.
Figure 2:
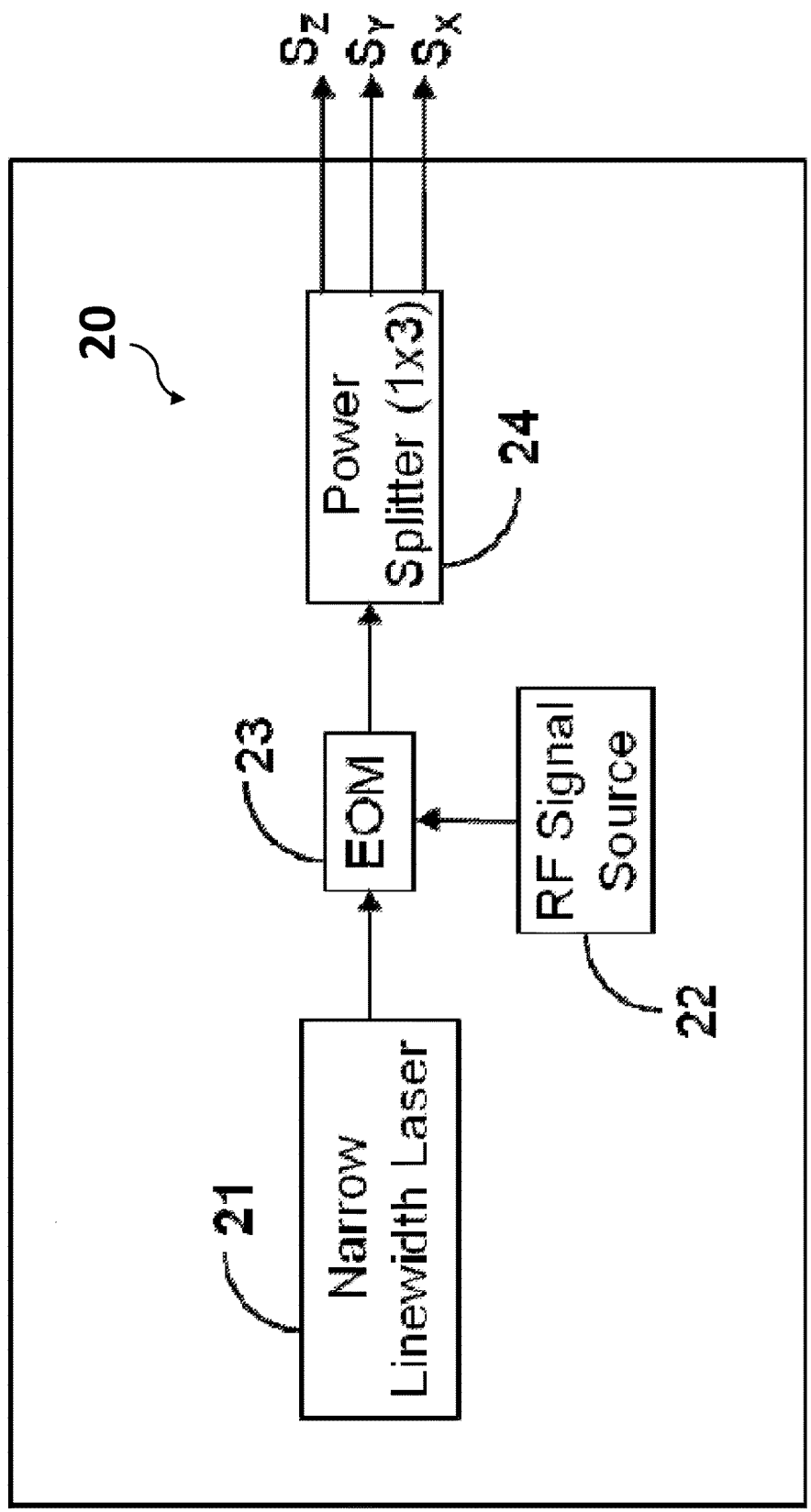
FIG. 2 is a block diagram of a laser light source of the three-dimensional (3D) gravitational wave detection system according to the first aspect in the present invention.

In one aspect, referring to FIGS. 1 and 2 of the drawings, a time-delayed enlarged three-dimensional (3D) gravitational wave detection system 100 may include three optical fibers along three axes (X, Y, and Z-axis), and a laser signal source 20 is operatively liked with the three optical fibers. In one embodiment, the three optical fibers are embodied as three branches, branch X 30, branch Y 40, and branch Z 50 for picking up the space/length changed caused by the gravitational waves, and the three branches have the same design and are perpendicular with each other, so the direction of an incoming gravitational wave can be identified by the three branches, regardless of the orientation.

As shown in FIG. 2, the laser signal source 20 is adapted to modulate by low noise RF source to generate an ultra-stable synchronized signal, Sx, $S_Y$, and Sz, wherein the laser signal source 20 comprises a narrow linewidth laser 21 to generate laser lights, an electro-optic modulator (EOM) 23 connected with the narrow linewidth laser 21 to modulate the laser light, and a RF signal source 22 connected to the EOM 23 to provide ultra-stable RF signal to the EOM 23. In one embodiment, the narrow linewidth laser 21 is adapted for carrying the ultra-stable RF signal, and the ultra-stable RF source is used for detecting the length changes caused by the gravitational wave. It is worth to mention that EOM 23 is a device to modulate the phase of a laser field, so when the laser light passes through the EOM 23 with ultra-stable RF signal, the laser light phase is modulated by the RF signal to become modulated lights.

The laser signal source 20 may further include a power splitter 24 connected with the EOM 23 to receive the phase modulated lights, and the phase modulated lights are transmitted to the power splitter 24 to generate the ultra-stable synchronized signal, Sx, $S_Y$, and Sz which are sent to the three branches X (30), Y (40), Z (50) for detecting the gravitational waves.

Figure 3:
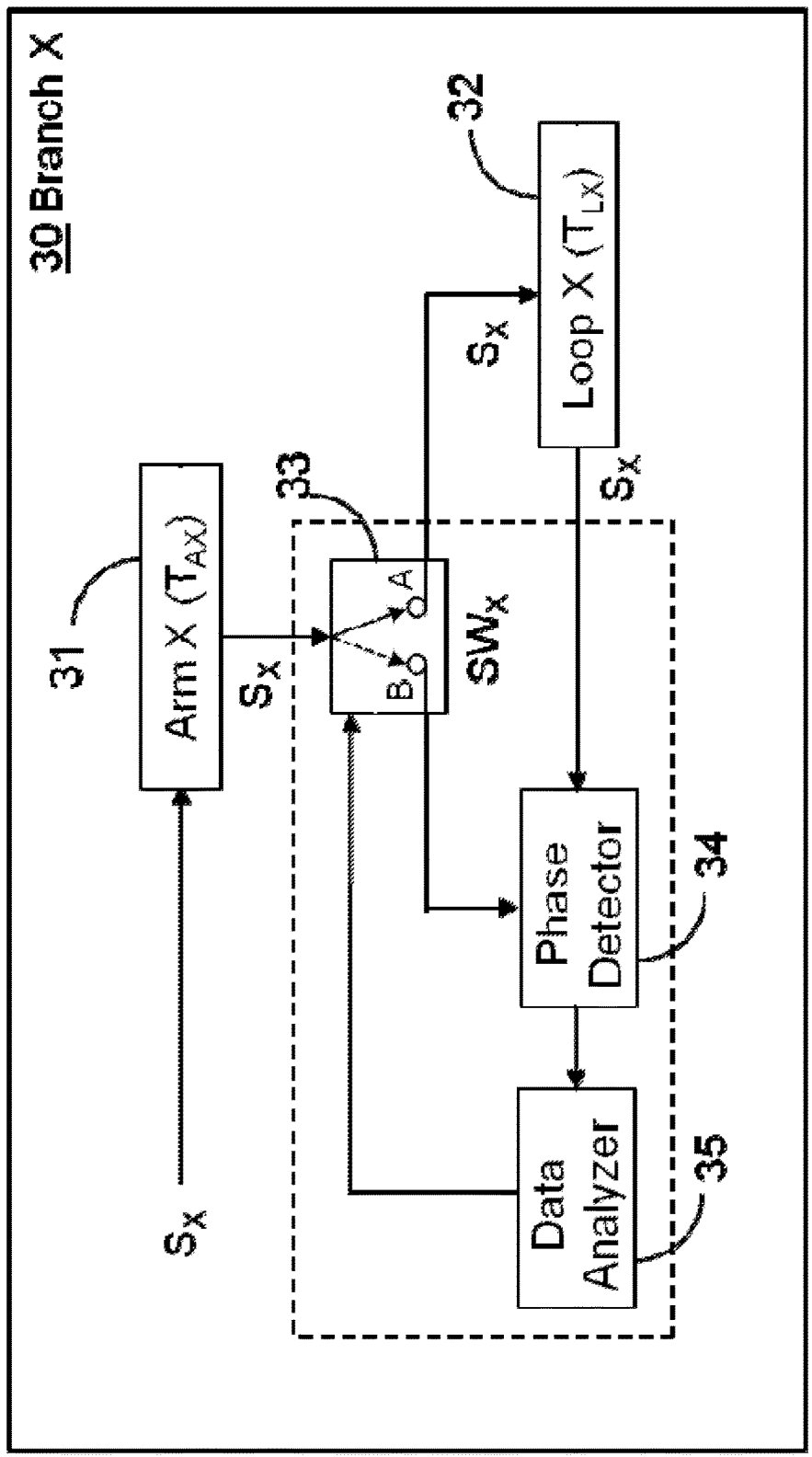
FIG. 3 is a block diagram of a branch X of the three-dimensional (3D) gravitational wave detection system according to the first aspect in the present invention.

It is worth to mention that structures of all three branches X (30), Y (40), Z (50) are the same, and the branch X (30) is described as shown in FIG. 3. The branch X (30) comprises a phase changing unit Arm X ($T_{AX}$) 31 to change the phase of the ultra-stable synchronized signal Sx, a loop X ($T_{LX}$) 32 connected with the phase changing unit Arm X ($T_{AX}$) 31 for enlarge the equivalent delayed length and time, and a phase detector 34 connected with the phase changing unit Arm X ($T_{AX}$) 31. In one embodiment, the loop X ($T_{LX}$) 32 is used to compare the phase change of the ultra-stable synchronized signal Sx, The branch X (30) may also include a loop switch SWx 33 connected with the phase changing unit Arm X ($T_{AX}$) 31, the loop X ($T_{LX}$) 32, and the phase detector 34 for guiding the ultra-stable synchronized signal Sx passing through either position A or position B, and a data analyzer 35 connected with the phase detector 34 for analyzing and synthesizing the data from the phase detector 34 and generating the three-dimensional data of the gravitational waves.

It is worth to mention that the ultra-stable synchronized signal Sx is passed through the phase changing unit Arm X ($T_{AX}$) 31, and then sent to the loop X ($T_{LX}$) 32 for recirculating for a time period ΔT, and meanwhile the Sx is continuously launched into the phase changing unit Arm X ($T_{AX}$) 31. After time period ΔT, the time-delayed and phase difference are enlarged, and thus the phase sensitivity for the system is increased. At this time, both the delayed signal in the phase changing unit Arm X ($T_{AX}$) 31 and the original signal in the loop X ($T_{LX}$) 32 are sent to phase detector 34 for detecting the phase changes from branch X (30). And, the gravitational wave's information is obtained through the data analyzer 35, and if the gravitational waves are passed through the phase changing unit Arm X ($T_{AX}$) 31, the phase of the Sx will be changed accordingly.

Figure 4:
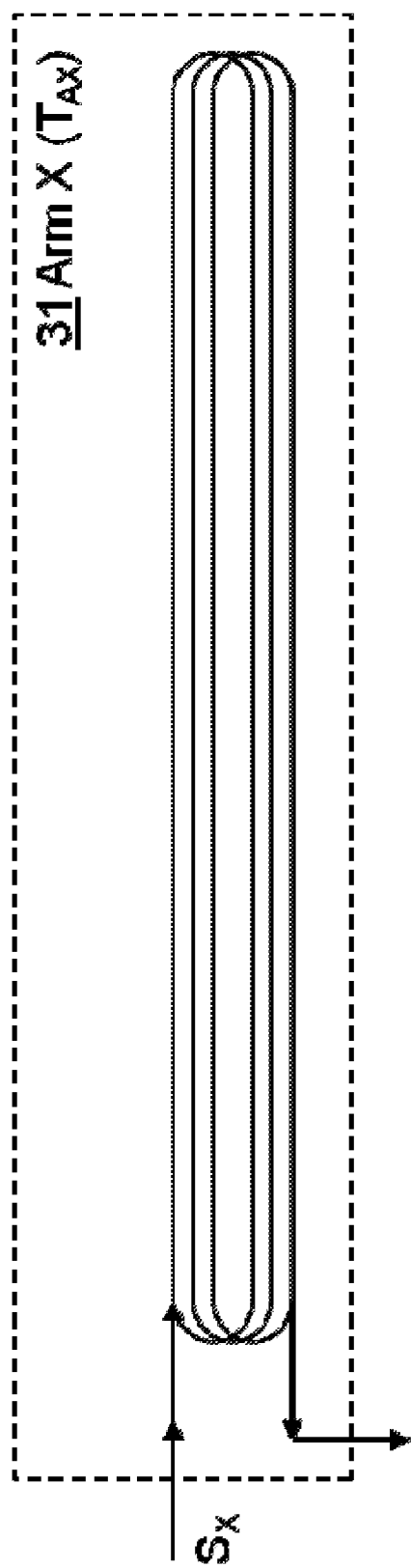
FIG. 4 is a block diagram of Arm X ($T_{AX}$) 31 of the three-dimensional (3D) gravitational wave detection system according to the first aspect in the present invention.

Referring to FIG. 4, the phase changing unit Arm X ($T_{AX}$) 31 comprises a segment of optical fiber with a typical length of 100 km that is winded on a fixture for usually 10 meters long, so it can be easily and vertically mounted vertically, and thus a three-dimensional detection system is built.

Figure 5:
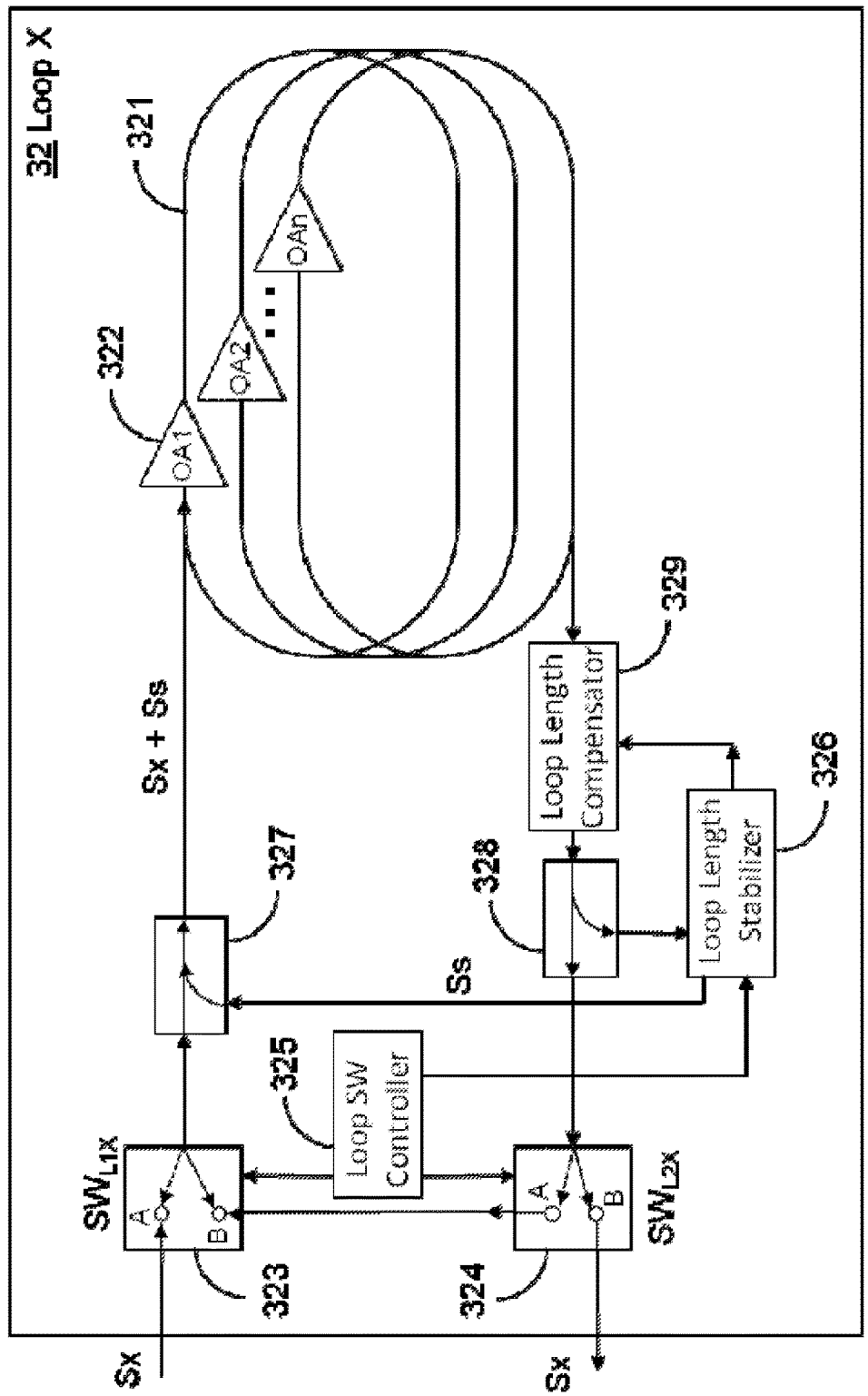
FIG. 5 is a block diagram of the recirculating optical loop of the three-dimensional (3D) gravitational wave detection system according to the first aspect the present invention.

Referring to FIG. 5, the loop X ($T_{LX}$) 32 may include two loop switches 323, 324, for receiving and recirculating the original signal Sx, and a loop switch controller 325 for selectively control the two loop switches 323, 324 being either a position A or a position B. For example, once the loop switch 323 is controlled by the loop switch controller 325 into the position A, and the loop switch 324 is controlled by the loop switch controller 325 in the position B, the ultra-stable synchronized signal Sx is received by the loop X ($T_{LX}$) 32. If the loop Switch 323 is in position B, and the loop Switch 324 is in position A, the ultra-stable synchronized signal Sx is recirculated inside the loop X ($T_{LX}$) 32. The recirculating times, defined as delayed times are controlled by loop switch controller 325.

In one embodiment, the loop X ($T_{LX}$) 32 may further include a plurality of optical amplifiers (OA1 to OAn) 322 for compensating the insertion loss caused by optical fibers 321. The loop X ($T_{LX}$) 32 may also include a loop length stabilizer 326, optical couplers (327, 328), and a loop length compensator 329 for stabilizing the loop length.

Figure 6:
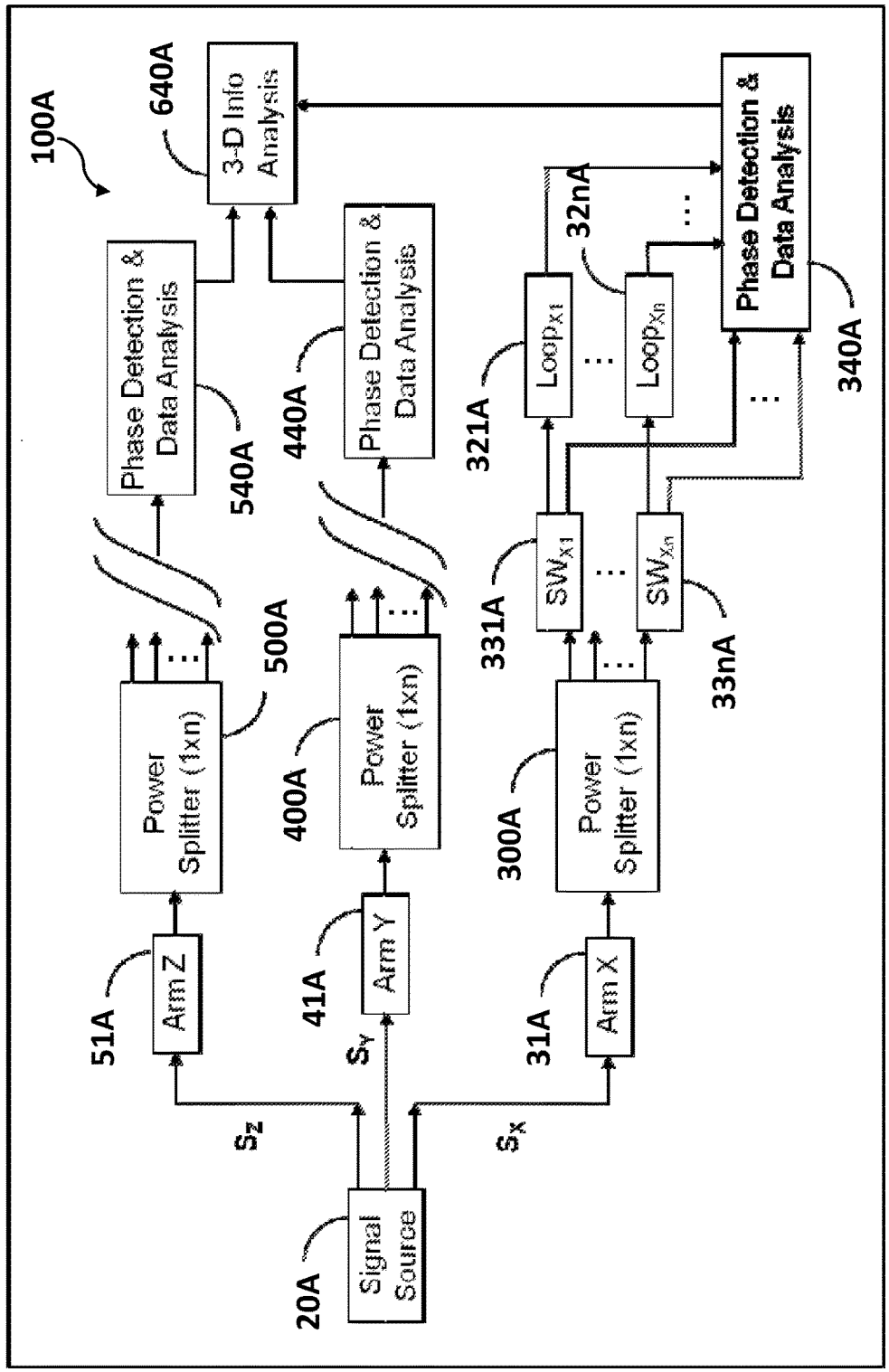
FIG. 6 is a block diagram of a multiple channel three-dimensional (3D) gravitational wave detection system according to a second aspect in the present invention.

Referring to FIG. 6 of the drawings, since the loop X ($T_{LX}$) 32 can only take a piece of signal Sx (about the length of the phase changing unit Arm X ($T_{AX}$)), the loop of the signal Sx is multiplied to carry different points of the signal Sx. Therefore, a multiple channel 3-D gravitational wave detection system 100A according to another aspect of the present invention is illustrated, wherein the system 100A comprises three branches X (30A), Y (40A), Z (50A), and each branches is the same.

The branch X 30A may include an Arm X ($T_{AX}$) 31A to change the phase of a plurality of ultra-stable synchronized signal $S_{x1}$ to $S_{xn}$, a power splitter 300A, a plurality of loop X1 ($T_{LX}$) 321A to loop Xn ($T_{LX}$) 32nA connected with the phase changing unit Arm X ($T_{AX}$) 31A for enlarge the equivalent delayed length and time, and a phase detector& Data analysis 340A connected with the phase changing unit Arm X ($T_{AX}$) 31A and the plurality of loop X1 to Xn ($T_{LX}$) 321A to compare the phase change of the plurality of ultra-stable synchronized signals $S_{x1}$ to $S_{xn}$. The branch X 30A may also include a plurality of loop switch SW1 331 to SWxn 33nA connected with the phase changing unit Arm X ($T_{AX}$) 31A, the plurality of loop X1 to loop Xn ($T_{LX}$) 321A, and the phase detector& Data analysis 340A for analyzing and synthesizing the data from the phase detector 340A and generating the 3-D data of the gravitational waves.

In one embodiment, the system 100A further comprises a three-dimensional info analysis 640A connected with the three branches X (30A), Y (40A), Z (50A), and the three-dimensional data of the gravitational waves generated from the three branches (X, Y, Z) are transmitted to the three-dimensional info analysis 640A, so the entire three-dimensional gravitational information is collected.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A time-delayed enlarged three-dimensional (3D) gravitational wave detection system, comprising:
    three optical fibers along three axes (X, Y, and Z-axis); and
    a laser signal source operatively linked with said three optical fibers;
    wherein said three optical fibers are identical and perpendicular with each other, and are adapted to pick up space/lengths changed caused by gravitational waves,
    wherein said laser signal source comprises a narrow linewidth laser to generate laser lights, an electro-optic modulator (EOM) connected with said narrow linewidth laser to modulate a phase of laser light, and a RF signal source connected to said EOM to provide ultra-stable RF signal to said EOM.

2. The system, as recited in claim 1, wherein said narrow linewidth laser is adapted for carrying the ultra-stable RF signal, and said ultra-stable RF source is used for detecting length changes caused by the gravitational waves.

3. The system, as recited in claim 2, wherein said laser signal source further comprises a power splitter connected with said EOM to receive the phase modulated lights to generate ultra-stable synchronized signals which are sent to the three optical fibers for detecting the gravitational waves.

4. The system, as recited in claim 3, wherein each of the optical fibers comprises a phase changing unit to change the phase of a respective ultra-stable synchronized signal; a loop connected with said phase changing unit for enlarging an equivalent delayed length and time; a phase detector connected with said phase changing unit and said loop to compare the phase changes of the ultra-stable synchronized signal; a loop switch connected with the phase changing unit, the loop, and the phase detector for guiding the ultra-stable synchronized signal passing through either position A or position B; and a data analyzer connected with said phase detector for analyzing and synthesizing the data from said phase detector and generating three-dimensional (3D) data of the gravitational waves.

5. The system, as recited in claim 4, wherein the ultra-stable synchronized signal is passed through said phase changing unit, and then sent to said loop for recirculating for a time period, and the ultra-stable synchronized signal is continuously launched into said phase changing unit.

6. The system, as recited in claim 5, wherein after said time period, the time-delayed and phase difference are enlarged, and the phase sensitivity for said system is increased.

7. The system, as recited in claim 6, wherein both the delayed signal in said phase changing unit and an original signal in said loop are sent to said phase detector for detecting the phase changes from said three branches, and the gravitational wave's information is obtained through said data analyzer.

8. The system, as recited in claim 7, wherein said phase changing unit comprises a segment of optical fiber with a typical length of 100 km that is winded on a fixture for usually 10 meters long.

9. The system, as recited in claim 4, wherein said loop comprises two loop switches for receiving and recirculating the ultra-stable synchronized signals, and a loop switch controller for selectively control said two loop switches.

10. The system, as recited in claim 9, wherein said loop further comprises a plurality of optical amplifiers for compensating an insertion loss caused by optical fibers.

11. A multiple channel three-dimensional (3D) gravitational wave detection system, comprising:
    three optical fibers along three axes (X, Y, and Z-axis);
    a laser signal source operatively linked with said three optical fibers; and
    a three-dimensional (3D) info analysis connected with said three optical fibers to collect an entire three-dimensional (3D) gravitational wave information;
    wherein said three optical fibers are identical, and are adapted to pick up space/lengths changed caused by gravitational waves,
    wherein said laser signal source comprises a narrow linewidth laser to generate laser lights, an electro-optic modulator (EOM) connected with said narrow linewidth laser to modulate a phase of laser light, and a RF signal source connected to said EOM to provide ultra-stable RF signal to said EOM.

12. The system, as recited in claim 11, wherein said narrow linewidth laser is adapted for carrying the ultra-stable RF signal, and said ultra-stable RF source is used for detecting length changes caused by the gravitational waves.

13. The system, as recited in claim 12, wherein said laser signal source further comprises a power splitter connected with said EOM to receive the phase modulated lights to generate ultra-stable synchronized signals which are sent to the three optical fibers for detecting the gravitational waves.

14. The system, as recited in claim 13, wherein each of the optical fibers comprises a phase changing unit to change the phase of a respective ultra-stable synchronized signal; a loop connected with said phase changing unit for enlarging an equivalent delayed length and time; a phase detector connected with said phase changing unit and said loop to compare the phase changes of the ultra-stable synchronized signal; a loop switch connected with the phase changing unit, the loop, and the phase detector for guiding the ultra-stable synchronized signal passing through either position A or position B; and a data analyzer connected with said phase detector for analyzing and synthesizing the data from said phase detector and generating three-dimensional (3D) data of the gravitational waves.

15. The system, as recited in claim 14, wherein the ultra-stable synchronized signal is passed through said phase changing unit, and then sent to said loops for recirculating for a time period, and the ultra-stable synchronized signal is continuously launched into said phase changing unit.

16. The system, as recited in claim 15, wherein after said time period, the time-delayed and phase difference are enlarged, and the phase sensitivity for said system is increased.

17. The system, as recited in claim 16, wherein both the delayed signal in said phase changing unit and an original signal in said loop are sent to said phase detector for detecting the phase changes from said three branches, and the gravitational wave's information is obtained through said data analyzer.

18. The system, as recited in claim 17, wherein said phase changing unit comprises a segment of optical fiber with a typical length of 100 km that is winded on a fixture for usually 10 meters long.

19. The system, as recited in claim 14, wherein each of said loops comprises a plurality of loop switches for receiving and recirculating the ultra-stable synchronized signals, and a loop switch controller for selectively control said two loop switches.

20. The system, as recited in claim 14, wherein said loop further comprises a plurality of optical amplifiers for compensating an insertion loss caused by optical fibers.

* * * * *